2,708,188
PRINTING ON VINYL PLASTICS

Gabriel F. Goldstein, New York, N. Y., assignor to Interchemical Corporation, New York, N. Y., a corporation of Ohio No Drawing. Application June 12, 1952,
Serial No. 293,198

11 Claims. (Cl. 260—22)

This invention relates to printing compositions for printing on vinyl plastics, especially vinyl chlorides and copolymers of vinyl chloride, and aims to provide compositions therefor which yield flexible, adherent and nontacky products which are resistant to normal cleaning procedures.

The vinyl plastics have come into major commercial prominence only during the last seven or eight years. Printing of such plastics is relatively new, and much of it has not reached commercial perfection. The vinyl plastics achieved rapid recognition because of their chemical inertness, toughness, and durability, and it is these properties which make printing upon them so difficult.

To be effective, printing compositions for vinyl plastics must have good adhesion, flexibility, and dry tack free. They must not cause puckering of the plastic, must not string out in printing, and must dry hard and be resistant to crocking, whitening, abrasion and soap. Added to these are the standard requirements, sometimes difficult to meet with conventional compositions for normal printing, of suitable viscosity, good coverage, lack of offensive odor, standing and running stability, and adaptability to conventional drying cycles. Such requirements for printing on smooth, resistant vinyl plastics are most difficult to meet.

I have overcome the above frustrating difficulties by formulating printing compositions in which the vehicles comprise a lower-alkyl methacrylate modified alkyd resin in admixture with a vinyl chloride-acetate copolymer, as the binder for the pigment. My printing compositions broadly comprise organic solvent solutions of these binders, but preferably they comprise pigmented water-in-oil emulsions with the binder dissolved in the oil phase. Using such compositions, in accordance with my invention, to print on vinyl plastics, I can print tack-free, adherent films on the vinyl plastic without any appreciable stiffening or puckering of the plastic, all of which properties have been desired heretofore.

The methacrylate-modified alkyd portion of the binders of my compositions is: (1) a copolymer of a lower alkyl methacrylate ester with a drying, oil modified alkyd resin; or (2) a mixture of a lower alkyl methacrylate ester resin with a drying, oil modified alkyd resin. By lower alkyl is meant an alkyl radical containing up to six carbon atoms, of which the methyl is preferred. And by a drying, oil modified alkyd is meant the resinous products of reaction of polyhydric alcohol and polybasic acid in which some of the polybasic acid is substituted by acids of the drying type, such as dehydrated castor oil, soya oil, and linseed oil acids and the amount of such oil modification is preferably from 20% to 60% of the alkyd.

The methacrylate modified alkyds used are those which are prepared either by copolymerizing a drying, oil modified alkyd resin with a lower alkyl methacrylate ester, or are prepared by mixing a drying, oil modified alkyd with a lower alkyl methacrylate resin polymer.

The copolymer may suitably be prepared by reacting a solution of drying, oil modified alkyd, in a high aromatic petroleum hydrocarbon solvent, with a lower alkyl methacrylate in the presence of a solvent therefor, the reaction temperature being of the order of 230–260° F., the latter phase of which may be accelerated by the addition of a fractional percent of benzoyl peroxide, based on the total solids, and bodying to the desired viscosity.

While all copolymers and mixtures are useful, I prefer those having 25–40% methacrylate; higher proportions of alkyd than 75% tend to give tacky films, while lower proportions of alkyd than 60% tend to give less stable emulsions.

I have found that the most generally useful binder in my compositions is one in which the amount of methacrylate-modified drying alkyd component exceeds that of the vinyl chloride-acetate component.

The amount of binder present in my compositions is widely variable, depending upon whether pigment is used, and upon the kind and amount of pigment present.

My printing compositions may be pigmented or unpigmented. The vehicle comprises vinyl chloride-acetate copolymer and lower alkyl methacrylate modified drying alkyd dissolved in a volatile, water-immiscible, organic solvent in which water may be emulsified up to the maximum for a water-in-oil emulsion. However, the most generally useful emulsion printing compositions contain about 10–25% aqueous inner phase. Small quantities of emulsifying agents, such as morpholine oleate and the like which promote the formation of water-in-oil emulsions, are frequently useful in the preparation of my emulsion compositions.

The vinyl chloride-acetate resins of my binders are the organic solvent soluble, film forming types, exemplified by the Vinylites, of which the 87% chloride, 13% acetate having an average Staudinger apparent molecular weight above 5,000 are preferred.

When my compositions are applied by means of a planographic printing press, such as a Waldron surface type press, as many as fourteen different colors may be applied without smearing. After the last color has been applied, the print is dried and cured, as by festooning at 120° to 140° F. for five to ten minutes, or by exposure to about 250–300° F. for about twenty seconds.

The following typical examples are given to illustrate my invention, proportions being by weight.

EXAMPLE A.—ALKYD-METHACRYLATE COPOLYMER 1. 41.2% dehydrated castor oil modified glyceryl phthalate, 41.7% solution in high aromatic solvent naphtha, 310–365° F. boiling range__ 2,417
2. Methyl methacrylate monomer_____ 873
3. High aromatic solvent naphtha, 310–365° F. boiling range _____ 75
4. Benzoyl peroxide_____ 4

Ingredients 1 and 2 were heated to reflux, and ingredients 3 and 4 were added slowly. Refluxing was continued and held for "X" viscosity, i. e. 12.9 poises, the cooking time being 5 hours and the temperature rising to 270° F. Other alkyd-methacrylate copolymers are similarly prepared.

EXAMPLE 1.—WHITE EMULSION INK

1. Alkyd-methacrylate copolymer (1.14 moles 41.2% dehydrated castor oil modified glyceryl phthalate to 1 mole methyl methacrylate)___ 63
2. Morpholine_____ 4.5
3. White vinyl concentrate (Formula A)_____ 268
4. Flat vinyl concentrate (Formula B)_____ 46
5. Oleic acid_____ 2

6. High flash naphtha (high aromatic petroleum hydrocarbon solvent, boiling range 157–185° C.) _____ 27
7. Water _____ 45.5

456

Ingredients 1, 2, 3 and 4 are mixed together, and ingredient 5 dissolved in 6 is then added. Ingredient 7 is then added to the mixture with high speed mixing, preferably with an Eppenbach mixer or a colloid mill.

*Formula A.—White vinyl concentrate*

1. Rutile titanium dioxide _____ 50
2. Vinyl chloride-acetate copolymer, 87% vinyl chloride, 10,000 ave. mol. wt. (e. g. Vinylite VYHH) _____ 6
3. Methyl isobutyl ketone _____ 44

100

Ingredient 1 was milled into the solution of 2 in 3 until smooth.

*Formula B.—Flat vinyl concentrate*

1. Talcum _____ 50
2. Vinyl chloride-acetate copolymer, 89.5% vinyl chloride, 16,000 ave. mol. wt. (e. g. Vinylite VYNS) _____ 6
3. Cyclohexanone _____ 44

100

Ingredient 1 was milled into the solution of 2 in 3 until smooth.

Example 1 is a water-in-oil emulsion containing 13.8% by weight of alkyd-methacrylate copolymer and 4.13% vinyl chloride acetate copolymer. Similar results are obtained when alkyd-methacrylate copolymer having 75% by weight alkyd is substituted for that given, which has 60% by weight alkyd, and good results are obtained when a 50% and 60% drying oil modified alkyd is substituted for that of the copolymer given which alkyd has 41.2% oil.

EXAMPLE 2.—BLUE EMULSION INK

1. Alkyd-methacrylate copolymer of Example 1__ 52.5
2. Blue vinyl concentrate (Formula C) _____ 143
3. Morpholine _____ 1
4. Oleic acid _____ 1.5
5. Flat vinyl concentrate (Formula B) _____ 111
6. High flash naphtha _____ 52.5
7. Water _____ 78

439.5

Ingredients 1, 3 and 5 are mixed together, ingredient 4 is dissolved in ingredient 6 and added thereto, then ingredient 2 is added, followed by the addition of 7 with high speed mixing until a uniform water-in-oil emulsion is formed. Good results are obtained when other drying oil fatty acids are substituted for the dehydrated castor oil fatty acids of the above alkyd, for instance, those of linseed and soya oil.

*Formula C.—Blue vinyl concentrate*

1. Phthalocyanine blue _____ 15
2. Vinyl chloride acetate copolymer of Formula B__ 22.5
3. Methylisobutyl ketone _____ 62.5

100

The pigment is milled into the vinyl copolymer until a uniform dispersion is obtained, which is cut with the ketone solvent.

Example 2 is a water-in-oil emulsion containing 11.95% alkyd-methacrylate copolymer and 8.85% vinyl chloride-acetate copolymer.

Both the white and blue emulsion inks of the preceding examples print well from a surface press, and dry at 140° F. for 10 minutes or 250° F. for 20 seconds to give clear crisp color effects having satisfactory adhesion to vinyl plastic.

EXAMPLE 3.—BLUE EMULSION INK

1. Alkyd-methacrylate copolymer (1.14 moles 41.2% linseed oil modified glyceryl phthalate to 1 mole methyl methacrylate) _____ 37.5
2. Phthalocyanine blue (20% aqueous dispersion) _____ 60
3. High aromatic hydrocarbon solvent, boiling range 152.2–172.80° C. (e. g. Solvesso 100)__ 60
4. Flat vinyl concentrate (Formula D) _____ 111
5. Clear vinyl concentrate (Formula E) _____ 30
6. Methyl methacrylate concentrate (Formula F)_ 24
7. Morpholine _____ 1.25
8. Methyl ethyl ketone and methyl isobutyl ketone, 1:1 _____ 15

338.75

Mix ingredients 1 and 3 to 8 together, then add 2 with high speed stirring and finish through a colloid mill.

*Formula D.—Flat vinyl concentrate*

1. Precipitated calcium carbonate _____ 50
2. Vinyl chloride-acetate copolymer of Formula A__ 10
3. Methyl isobutyl ketone _____ 40

100

*Formula E.—Clear vinyl concentrate*

1. Vinyl chloride-acetate copolymer of Formula A__ 40
2. Methyl isobutyl ketone _____ 60

100

Ingredient 1 is dissolved in 2.

*Formula F.—Methyl methacrylate concentrate*

1. Methyl methacrylate polymer _____ 30
2. High aromatic hydrocarbon solvent of Example 3_ 35
3. Methyl ethyl ketone _____ 35

100

Ingredient 1 is dissolved in a mixture of 2 and 3.

Example 3 is a water-in-oil emulsion having 13.18% methacrylate modified alkyd resin and 6.82% vinyl chloride-acetate copolymer.

EXAMPLE 4.—YELLOW EMULSION INK

1. Cadmium yellow concentrate (Formula G) _____ 218
2. Clear vinyl concentrate (Formula E) _____ 75
3. Flat vinyl concentrate (Formula D) _____ 280
4. Morpholine _____ 12
5. Oleic acid _____ 12
6. High flash naphtha _____ 38
7. Water _____ 113

748

Mix ingredients 1 to 6 together and add 7 with high speed stirring until a uniform water-in-lacquer emulsion is obtained. It contains 10.2% alkyd-methacrylate copolymer and 7.75% vinyl chloride-acetate copolymer.

*Formula G.—Cadmium yellow concentrate*

1. Cadmium yellow _____ 65
2. Alkyd-methacrylate copolymer of Example 1_____ 35

100

Mix 1 with 2 until uniform.

EXAMPLE 5.—WHITE EMULSION INK

1. Alkyd resin solution (50% drying oil modified glyceryl phthalate, 50% in xylol) _____ 5

2. White methyl methacrylate concentrate (Formula H) ............................................. 56.75
3. Flat alkyd concentrate (Formula J) ............ 10.75
4. Morpholine ........................................ 1
5. Oleic acid ........................................ 0.5
6. Clear vinyl concentrate (Formula E) ........... 16
7. Water ............................................. 10

100

Ingredients 1 to 6 are mixed together and 7 is added with high-speed stirring, the whole then being colloid milled. It contains 19.25% methacrylate modified drying alkyd and 6.4% vinyl chloride-acetate copolymer.

*Formula H.—White methyl methacrylate concentrate*

1. Rutile titanium dioxide ........................ 60
2. Methyl methacrylate concentrate (Formula F) ... 36
3. Aromatic hydrocarbon solvent of Example 3 .... 24
4. Cyclohexanone .................................. 20

140

Mill ingredient 1 into 2 and cut with 3 and 4.

*Formula J.—Flat alkyd concentrate*

1. Alkyd resin solution (50% drying oil modified glyceryl phthalate, 50% in xylol) ............. 20
2. Talc ........................................... 40
3. High aromatic hydrocarbon solvent of Example 3 ... 40

100

EXAMPLE 6

1. Isobutyl methacrylate-alkyd copolymer (containing 60% alkyd of Example 1) ................. 14.5
2. White vinyl concentrate (Formula A) .......... 57
3. Morpholine ..................................... 1
4. Oleic acid ..................................... 0.5
5. Flat vinyl concentrate (Formula B) ............ 11
6. High flash naphtha ............................. 6
7. Water .......................................... 10

100

EXAMPLE 7

1. Butyl methacrylate-alkyd copolymer (containing 60% alkyd of Example 1) ..................... 14.5
2. White vinyl concentrate (Formula A) .......... 57
3. Morpholine ..................................... 1
4. Oleic acid ..................................... 0.5
5. Flat vinyl concentrate (Formula B) ............ 11
6. High flash naphtha ............................. 6
7. Water .......................................... 10

100

Examples 6 and 7 are prepared similarly to Example 1. Good printing non-emulsion compositions are obtained by omitting the water, morpholine and oleic acid. In either case, the organic phase can be pigmented with colored pigments. The running stability, printing, drying and fastness properties of these compositions are eminently satisfactory.

This invention has made it possible to print upon such vinyl plastic surfaces as the polyvinyl chlorides, the vinyl chloride-acetate copolymers, and the vinyl chloride-vinylidene chloride copolymers, particularly the vinyl film and sheet products which are used, for example, in making shower curtains, upholstery materials, drafting instruments, and the like, the printing thereupon being flexible, adherent, non-tacky, and resistant to functional usage and cleaning procedures.

This application is a continuation-in-part of Serial No. 156,713, filed April 18, 1950 and now abandoned.

I claim:

1. Printing compositions for printing on vinyl plastics, comprising a volatile, water-immiscible, organic solvent solution of a vinyl chloride-vinyl acetate copolymer and of a member of the group consisting of (1) a mixture of a lower alkyl methacrylate resin, in which the alkyl contains up to six carbon atoms, with a 20 to 60% drying oil modified alkyd resin and (2) copolymers of a lower-alkyl methacrylate in which the alkyl contains up to six carbon atoms with a 20–60% drying oil modified alkyd resin.

2. Printing compositions for printing on vinyl plastics, comprising pigment dispersed in a volatile, water-immiscible, organic solvent solution of a vinyl chloride-vinyl acetate copolymer and of a member of the group consisting of (1) a mixture of a lower alkyl methacrylate resin, in which the alkyl contains up to six carbon atoms, with a 20 to 60% drying oil modified alkyd resin and (2) copolymers of a lower-alkyl methacrylate in which the alkyl contains up to six carbon atoms with a 20–60% drying oil modified alkyd resin.

3. A water-in-oil emulsion for printing on vinyl plastics, the continuous phase of which comprises a volatile, water-immiscible, organic solvent solution of a vinyl chloride-vinyl acetate copolymer and of a member of the group consisting of (1) a mixture of a lower alkyl methacrylate resin, in which the alkyl contains up to six carbon atoms with a 20 to 60% drying oil modified alkyd resin and (2) a copolymer of a lower-alkyl methacrylate with a 20 to 60% drying oil modified alkyd resin.

4. A pigmented water-in-oil emulsion as claimed in claim 3 wherein the lower alkyl methacrylate is methyl methacrylate.

5. A pigmented water-in-oil emulsion for printing on vinyl plastics, the continuous phase of which comprises a water-insoluble pigment dispersed in a volatile, water-immiscible, organic solvent solution of a vinyl chloride-vinyl acetate copolymer and of a member of the group consisting of (1) a mixture of a lower alkyl methacrylate resin in which the alkyl contains up to six carbon atoms, with a 20 to 60% drying oil modified alkyd resin and (2) a copolymer of a lower-alkyl methacrylate, in which the alkyl contains up to six carbon atoms, with a 20 to 60% drying oil modified alkyd resin.

6. A pigmented water-in-oil emulsion for printing on vinyl plastics, the continuous phase of which comprises a water-insoluble pigment dispersed in a volatile, water-immiscible, organic solvent solution of binder resin consisting of a minor proportion of a vinyl chloride-vinyl acetate copolymer and of a major proportion of a member of the group consisting of (1) a mixture of a lower alkyl methacrylate resin, in which the alkyl contains up to six carbon atoms, with a 20 to 60% drying oil modified alkyd resin and (2) a copolymer of a lower alkyl methacrylate, in which the alkyd contains up to six carbon atoms, with a 20 to 60% drying oil modified alkyd resin.

7. A pigmented water-in-oil emulsion for printing on vinyl plastics, the continuous phase of which comprises a water-insoluble pigment dispersed in a volatile, water-immiscible, organic solvent solution of a binder consisting of a minor proportion of a vinyl chloride-vinyl acetate polymer and of a major proportion of a mixture of 25 to 40 parts lower alkyl methacrylate, in which the alkyl contains up to six carbon atoms, resin with 75 to 60 parts of a 20 to 60% drying oil modified alkyd.

8. A pigmented water-in-oil emulsion for printing on vinyl plastics, the continuous phase of which comprises a water-insoluble pigment dispersed in a volatile, water-immiscible, organic solvent solution of a binder consisting of a minor proportion of a vinyl chloride-vinyl acetate polymer and of a major proportion of a mixture of 25 to 40 parts lower alkyl methacrylate, in which the alkyl contains up to six carbon atoms, resin with 75 to 60 parts of a 20 to 60% dehydrated castor oil modified glyceryl phthalate alkyd.

9. A pigmented water-in-oil emulsion as claimed in claim 7 wherein the lower alkyl methacrylate is methyl methacrylate.

10. A pigmented water-in-oil emulsion for printing on vinyl plastics, the continuous phase of which comprises a water-insoluble pigment dispersed in a volatile, water-immiscible, organic solvent solution of a binder consisting of a minor proportion of a vinyl chloride-vinyl acetate polymer and of a major proportion of a copolymer of 25 to 40 parts lower alkyl methacrylate, in which the alkyl contains up to six carbon atoms, resin with 75 to 60 parts of a 20 to 60% drying oil modified alkyd resin.

11. A pigmented water-in-oil emulsion for printing on vinyl plastics, the continuous phase of which comprises a water-insoluble pigment dispersed in a volatile, water-immiscible, organic solvent solution of a binder consisting of a minor proportion of a vinyl chloride-vinyl acetate polymer and of a major proportion of a copolymer of 25 to 40 parts lower alkyl methacrylate, in which the alkyl contains up to six carbon atoms, with 75 to 60 parts of a 20 to 60% dehydrated castor oil modified glycerol phthalate resin.

No references cited.